(12) United States Patent
Koeske et al.

(10) Patent No.: US 8,403,307 B2
(45) Date of Patent: Mar. 26, 2013

(54) GAS SPRING ASSEMBLY AND METHOD OF MANUFACTURE

(75) Inventors: Paul P. Koeske, Fishers, IN (US); Jason B. Smith, Avon, IN (US); Keith A. Taylor, Williamsburg, KY (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 1210 days.

(21) Appl. No.: 12/201,804

(22) Filed: Aug. 29, 2008

(65) Prior Publication Data

US 2009/0057967 A1 Mar. 5, 2009

Related U.S. Application Data

(60) Provisional application No. 60/966,859, filed on Aug. 30, 2007.

(51) Int. Cl.
*F16F 9/04* (2006.01)

(52) U.S. Cl. .................... 267/64.27; 267/64.24

(58) Field of Classification Search ..... 267/64.19–62.28
See application file for complete search history.

(56) References Cited

U.S. PATENT DOCUMENTS

| | | | | | |
|---|---|---|---|---|---|
| 3,549,142 | A | * | 12/1970 | Tilton | 267/64.24 |
| 3,897,941 | A | * | 8/1975 | Hirtreiter et al. | 267/64.24 |
| 4,378,935 | A | * | 4/1983 | Brown et al. | 267/64.27 |
| 4,673,168 | A | * | 6/1987 | Warmuth et al. | 267/64.27 |
| 5,346,187 | A | * | 9/1994 | Drescher | 267/64.11 |
| 5,566,929 | A | * | 10/1996 | Thurow | 267/64.24 |
| 5,580,033 | A | * | 12/1996 | Burkley et al. | 267/64.27 |
| 6,113,081 | A | * | 9/2000 | Hilburger et al. | 267/64.27 |
| 6,264,178 | B1 | * | 7/2001 | Schisler et al. | 267/64.27 |
| 6,460,836 | B1 | * | 10/2002 | Trowbridge | 267/64.27 |
| 6,682,058 | B1 | * | 1/2004 | Nemeth et al. | 267/64.27 |
| 2006/0226586 | A1 | * | 10/2006 | Levy | 267/64.27 |

FOREIGN PATENT DOCUMENTS

FR 1 156 323 A 5/1958

* cited by examiner

*Primary Examiner* — Christopher Schwartz

(74) *Attorney, Agent, or Firm* — Jason A. Houser; Fay Sharp LLP

(57) ABSTRACT

A flexible wall and end structure assembly includes a flexible wall and an end structure. The flexible wall is formed from an elastomeric material and a filament structure. A bead wire is formed into an open end of the flexible wall. The end structure is received along the open end of the flexible wall and forms a substantially fluid-tight seal therewith. A portion of the filament structure is compressed between the bead wire and the end structure and extends therefrom in radially-outwardly spaced relation to said end structure. A gas spring assembly including such a flexible wall and end structure assembly is included. A method of manufacture is also included.

20 Claims, 4 Drawing Sheets

GAS SPRING ASSEMBLY AND METHOD OF MANUFACTURE

This application claims priority from U.S. Provisional Patent Application No. 60/966,859 filed on Aug. 30, 2007, which is hereby incorporated herein by reference in its entirety.

BACKGROUND

The present disclosure broadly relates to the art of spring devices.

Spring devices of the present disclosure find particular application and use in conjunction with suspension systems of wheeled vehicles, and will be described herein with specific reference thereto. However, spring devices of the present disclosure are also amenable to use in other applications and environments. Thus, it is to be understood that any applications and/or uses specifically shown, described or otherwise referred to herein are merely exemplary.

It is well known that land vehicles of most types and kinds are outfitted with a suspension system that supports a sprung mass (e.g., a body or chassis) of the vehicle on an unsprung mass (e.g., axles or wheel-engaging members) of the vehicle. It is also well known for some suspension systems to include gas spring devices that are operatively connected between the sprung and unsprung masses of the vehicle. Typically, such gas spring devices include two relatively rigid end members that are sealingly connected to respective open ends of a spring wall to at least partially form a spring chamber therebetween. The end members of such gas spring assemblies are often constructed of metal. However, in some constructions a substantially rigid plastic material has been used.

The spring wall is adapted to flex during dynamic operation and use of the gas spring device and is therefore normally made from a flexible, elastomeric material. During operation, the gas spring device is loaded such that opposing forces act against the end members. It is well recognized in the art that the spring wall does not itself support the load. Rather, the pressurized gas retained within the gas spring device by the spring wall acts against the end members and thereby provides forces capable of supporting loads applied to the end members.

To withstand the forces applied thereto by the aforementioned pressurized gas, conventional spring walls commonly include internal reinforcement that acts to buttress the elastomeric material of the spring wall and thereby help to restrict the expansion of the same, both under internal design pressures and under dynamic pressure levels associated with use under load. Such internal reinforcing structures typically include reinforcement filaments or cords that are embedded in the material from which the spring wall is constructed.

As discussed above, it is the pressurized gas within the gas spring device that supports any load acting thereon. Thus, it is normally desirable to retain the pressurized gas within the spring chamber and minimize pressurized gas losses such as, for example, may be due to the formation of exit pathways through which the pressurized gas can escape from the spring chamber. As such, most known gas spring constructions endeavor to provide a robust interconnection between the spring wall and the corresponding end structure or end member. Thus, even minor separations between the material of the spring wall and the end structure or end member are not normally expected to result in the formation of an exit pathway therebetween.

However, it has been recognized that the filament structure embedded within the spring wall can act as a network of small passageways disposed throughout the spring wall. Thus, pressurized gas from the spring chamber that is permitted to reach this network of small passageways may eventually find an exit path through which the pressurized gas can reach an environment external to the gas spring device. It has also been recognized that otherwise minor separations along the interface between the elastomeric material of the spring wall and the corresponding end structure or end member, while normally not sufficient to operate as an exit path by itself, can provide access for the pressurized gas to reach the filament structure of the spring wall and, thus, the network of small passageways formed thereby.

Accordingly, it is desirable to develop a spring wall and end structure connection and/or interface that overcomes the foregoing and other difficulties and/or disadvantages.

BRIEF DESCRIPTION

A gas spring assembly in accordance with the subject matter of the present disclosure is provided that includes a first end member adapted for securement along a first associated structural component. A second end member is adapted for securement along a second associated structural component and is spaced from the first end member such that a long-extending axis is disposed therebetween. A flexible wall extends circumferentially about the longitudinally-extending axis such that the flexible wall includes first and second ends. The first end of the flexible wall is secured on the first end member such that a substantially fluid-tight seal is formed therebetween. The flexible wall is formed from a filament structure and a quantity of elastomeric material. The filament structure extends longitudinally within the flexible wall between the first and second ends. A bead wire that includes a radially-inward surface area extends circumferentially about the longitudinal axis and is formed into the flexible wall along the first end thereof such that a first portion of the filament structure extends through the bead wire along the radially-inward surface area of the bead wire. An end closure includes an end wall and a side wall that extends longitudinally from the end wall. The side wall includes an outermost peripheral wall portion that is disposed generally opposite the end wall and extends radially outwardly beyond at least a portion of the bead wire. The end closure is received within the first end of the flexible wall and is bonded thereto such that a substantially fluid-tight seal is formed therebetween. The end closure is positioned along the flexible wall such that the first portion of the filament structure is compressively captured between the bead wire and the side wall of the end closure. This thereby establishes a line of contact about the end closure. The filament structure extends from along the line of contact in radially-outwardly spaced relation to the outermost peripheral wall portion of the side wall such that a quantity of elastomeric material having a thickness of at least 0.005 inches is disposed between the filament structure and the outermost peripheral wall portion.

A flexible wall and end structure assembly in accordance with the subject matter of the present disclosure is provided that includes a flexible wall extending circumferentially about a longitudinally-extending axis and thereby forming opposing first and second open ends. The flexible wall is formed from a filament structure and a quantity of elastomeric material with the filament structure extending longitudinally within the flexible wall between the first and second ends. A bead wire has a radially-inward surface area that at least partially defines an inside dimension of the bead wire. The bead wire is disposed circumferentially about the longitudinally-extending axis and is embedded within the flexible wall along the first open end thereof such that a first portion of the filament structure extends through the bead wire along the radially-inward surface area. An end structure includes a first wall that extends approximately transverse to the longitudinally-extending axis and a second wall that extends in approximate alignment with the longitudinally-extending axis. The second wall includes an outermost peripheral wall area that at least partially defines an outside dimension of the end structure with the outside dimension being greater than the inside dimension of the bead wire. The end structure is positioned along the flexible wall such that the second wall of the end structure is received within the first end of the flexible wall and the first portion of the filament structure is compressively captured between the radially-inward surface area of the bead wire and the second wall of the end structure. This thereby forms a line of contact along the filament structure. The end structure and the flexible wall are bonded together such that a substantially fluid-tight seal is formed therebetween. The filament structure extends in radially-outwardly spaced relation to the second wall of the end structure such that non-zero included angle is formed between a first cross-sectional reference line extending from a point along the line of contact to the outermost peripheral wall area of the second wall and a second cross-sectional reference line extending from the point along the line of contact to a radially-innermost point along the filament structure.

A method of manufacturing a gas spring assembly is provided in accordance with the subject matter of the present disclosure that includes at least partially forming a flexible wall from at least a filament structure and a quantity of elastomeric material such that the flexible wall extends circumferentially about a longitudinally-extending axis and thereby defines opposing first and second open ends thereof. The method also includes providing a bead wire that includes a radially-inward surface area and positioning the bead wire along the flexible wall adjacent the first open end such that a first portion of the filament structure is disposed along the radially-inward surface area of the bead wire. The method further includes providing an end structure that includes an end wall and a side wall extending from the end wall with the side wall including an outermost peripheral wall portion disposed generally opposite the end wall. The method also includes receiving the end structure within the first open end of the flexible wall such that the first portion of the filament structure and the radially-inward surface area of the bead wire are disposed along the side wall portion. The method further includes compressively capturing the first portion of the filament structure between the radially-inward surface area of the bead wire and the side wall portion of the end structure such that a line of contact is formed therealong. The method also includes further processing the flexible wall and the end structure and thereby bonding the elastomeric material of the flexible wall to the end structure to form a substantially fluid-tight seal therebetween and displacing the filament structure relative to the side wall of the end structure such that the filament structure extends from along the line of contact in radially-outwardly spaced relation to the outermost peripheral wall portion of the side wall.

DETAILED DESCRIPTION

Figure 1:
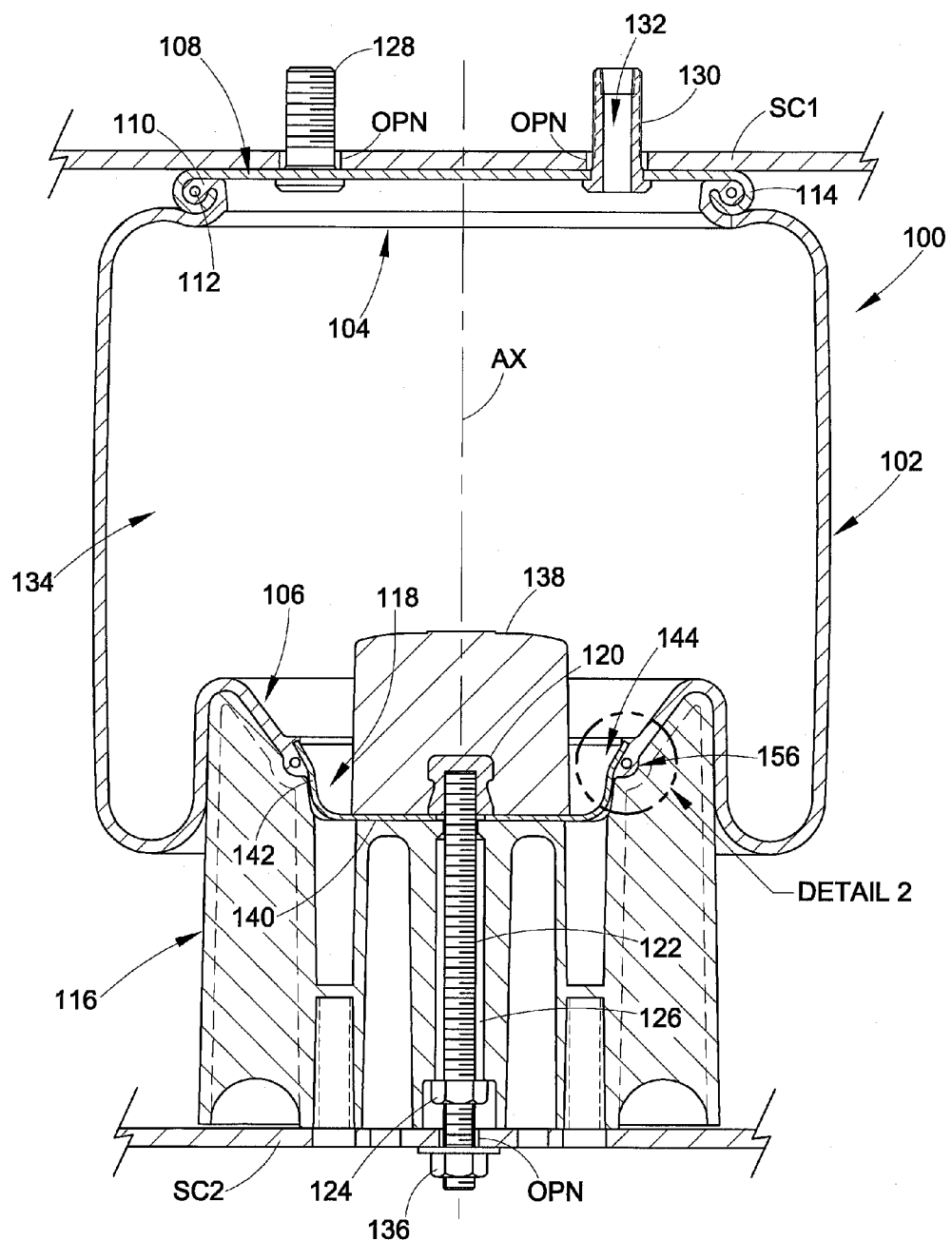
FIG. 1 is a side view, in partial cross-section, of one exemplary embodiment of a gas spring assembly in accordance with the present disclosure.

Turning now to the drawings, wherein the showings are for the purpose of illustrating exemplary embodiments of the subject matter of the present disclosure and which are not intended as a limitation of the same, FIG. 1 illustrates a gas spring assembly 100 that includes a flexible wall 102 extending longitudinally between opposing first and second ends 104 and 106. A longitudinally-extending axis AX extends between the opposing first and second ends and flexible wall 102 extends circumferentially thereabout. A first end member, such as a bead plate 108, for example, is disposed along first end 104 and can be secured thereto in any manner suitable for forming a substantially fluid-tight seal therewith. For example, flexible wall 102 can include a mounting bead 110 with a bead wire 112 (which may also be referred to in the art as a bead ring) optionally embedded therein and bead plate 108 can include an outer peripheral wall portion 114 that is crimped or otherwise formed around at least a portion of the bead wire.

Additionally, a second end member, such as a piston 116, for example, is disposed along second end 106 of the flexible wall. Again, it will be appreciated that the flexible wall can be secured on or along the second end member in any suitable manner. For example, gas spring assembly 100 includes an end structure, such as an end closure 118 as is shown in FIG. 1, for example, that is engaged with flexible wall 102. In the exemplary embodiment shown, end closure 118 engages the flexible wall along second end 106 thereof. As such, second end 106 of flexible wall 102 is shown as being compressively captured between end closure 118 and piston 116. It will be appreciated, however, that in other exemplary gas spring constructions, such an end structure may be optional.

As mentioned above, an end structure, such as end closure 118, for example, if provided, can be secured to a corresponding end member, such as piston 116, for example, in any suitable manner. For example, a first securement device or feature, such as a threaded bumper mount 120, for example, can be provided on or along the end structure. A second securement device or feature, such as a threaded mounting stud 122, for example, can be operatively secured to the first securement devices or feature and can extend into or along the corresponding end member. A third securement device or feature, such as a threaded nut 124, for example, can then be operatively secured along the second securement device or feature and engage the corresponding end member to secure the end structure and end member together. As shown in FIG. 1, threaded mounting stud 122 threadably engages bumper mount 120 and projects therefrom through a passage 126 formed into piston 116. Threaded nut 124 is received along mounting stud 122 and engages piston 116 to secure end closure 118 on the piston. By tensioning threaded mounting stud 122 using threaded nut 124, the exemplary arrangement is operative to draw end closure 118 toward piston 116 and, thus, is also operative to compress or otherwise secure at least a portion of flexible wall 102 along second end 106 thereof between the end structure and the end member (e.g., end closure 118 and piston 116) to form a substantially fluid-tight seal therebetween.

A gas spring assembly in accordance with the present disclosure can be operatively disposed between associated structural members, such as spaced structural components of a vehicle or vehicle suspension, for example. Additionally, a gas spring assembly in accordance with the present disclosure can include any suitable features and/or components for securement of the gas spring assembly on, along or otherwise between the associated structural members. Gas spring assembly 100 is shown in FIG. 1 as being disposed between a first or upper structural component SC1 and a second or lower structural component SC2. Gas spring assembly 100 also includes first and second mounting studs 128 and 130 disposed along and projecting from bead plate 108 and through openings OPN in first structural component SC1. Second mounting stud 130 also includes a passage 132 formed therethrough that is in fluid communication with a spring chamber 134 that is at least partially formed between the end members by flexible wall 102. Mounting stud 122 is shown in FIG. 1 as projecting through an opening OPN in second structural component SC2 and receiving a second threaded nut 136 for securing the second end member (e.g., piston 116) along second structural component SC2. As mentioned above, however, it will be appreciated that any other suitable arrangement and/or configuration could alternately be used.

A gas spring assembly in accordance with the present disclosure can also include any one or more additional components and/or features, such as a height sensing device, for example. As another example, a bumper 138 or other such device can optionally be included on or within the gas spring assembly. Additionally, gas spring assembly 100 is shown in FIG. 1 and described herein as being of a rolling-lobe type construction in which flexible wall 102 is displaced along an outer side wall of piston 116. It will be appreciated, however, that use of the subject concept in connection with such a rolling-lobe type construction is merely exemplary and that the subject concept can be used in connection with gas spring assemblies of any other suitable construction and/or configuration, such as convoluted bellows-type constructions, for example.

As discussed above, in the exemplary embodiment shown in FIG. 1, the end structure along second end 106 of flexible wall 102 is of the type and construction that is commonly referred to in the art as an end closure. It will be appreciated that end closures of a wide variety of shapes, sizes and configurations are known and commonly used. As such, it is to be understood that end closure 118 in FIG. 1 is merely representative of one suitable end structure for a gas spring assembly. In the exemplary embodiment shown, end closure 118 includes a first wall 140 (which may also be referred to herein as a bottom wall or an end wall) that extends approximately transverse to axis AX. End closure 118 also includes a second wall 142 (which may also be referred to herein as a side wall) that extends longitudinally from first wall 140 in approximate alignment with axis AX. With more-specific reference to FIG. 1, first wall 140 is shown extending perpendicular to axis AX with second wall 142 extending longitudinally from the first wall and tapering or otherwise extending radially-outwardly therefrom to an open end 144.

Figure 2:
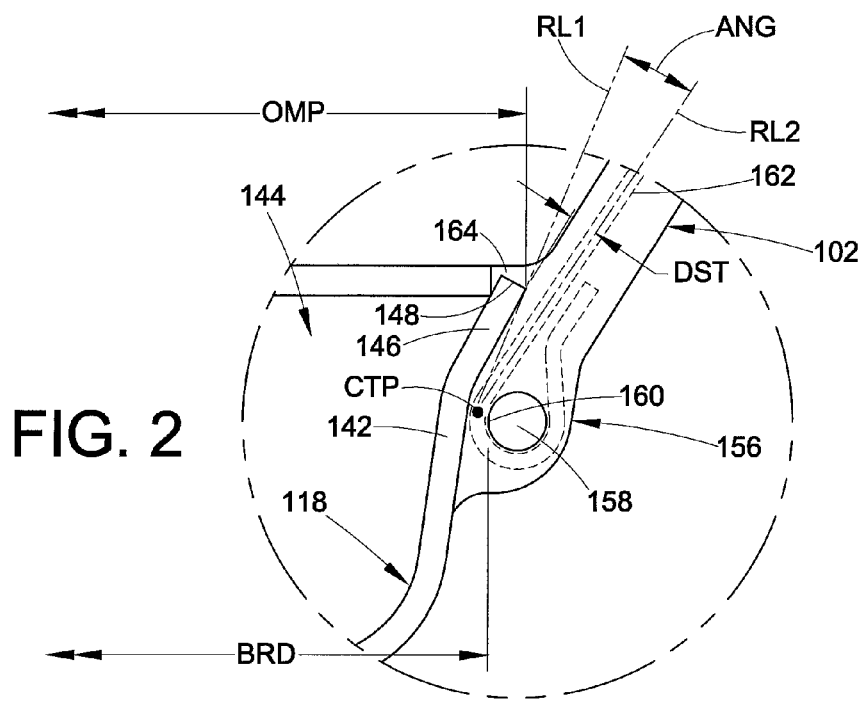
FIG. 2 is a greatly enlarged view of the portion of the exemplary spring wall and end structure shown in Detail 2 of FIG. 1.

As is shown in additional detail in FIG. 2, an end structure, such as end closure 118, for example, can include one or more additional features, profiles and/or configurations along the second or side wall thereof. For example, second wall 142 of end closure 118 is shown as including a radially-outwardly extending wall portion or lip 146 formed along the second wall generally opposite the first wall of the end closure. End closure 118 also includes an outermost peripheral area or wall portion, which is represented in FIG. 2 by dimension OMP.

In the exemplary embodiment shown in FIGS. 1 and 2, radially-outwardly projecting lip 146 has a substantially linear cross-sectional profile and extends from along second wall 142 at a radially-outward angle relative thereto such that a frustoconical outside profile of the lip is formed. It will be appreciated, however, that such a radially-outwardly projecting wall portion or lip can take any suitable shape and/or configuration. For example, an alternate construction is shown in FIG. 3 in which a radially-outwardly projecting wall portion or lip 146A has a curvilinear cross-sectional profile (e.g., a simple radius, a compound curve, or an s-shape) resulting in a radially-outwardly flared outside profile of the lip.

Figure 3:
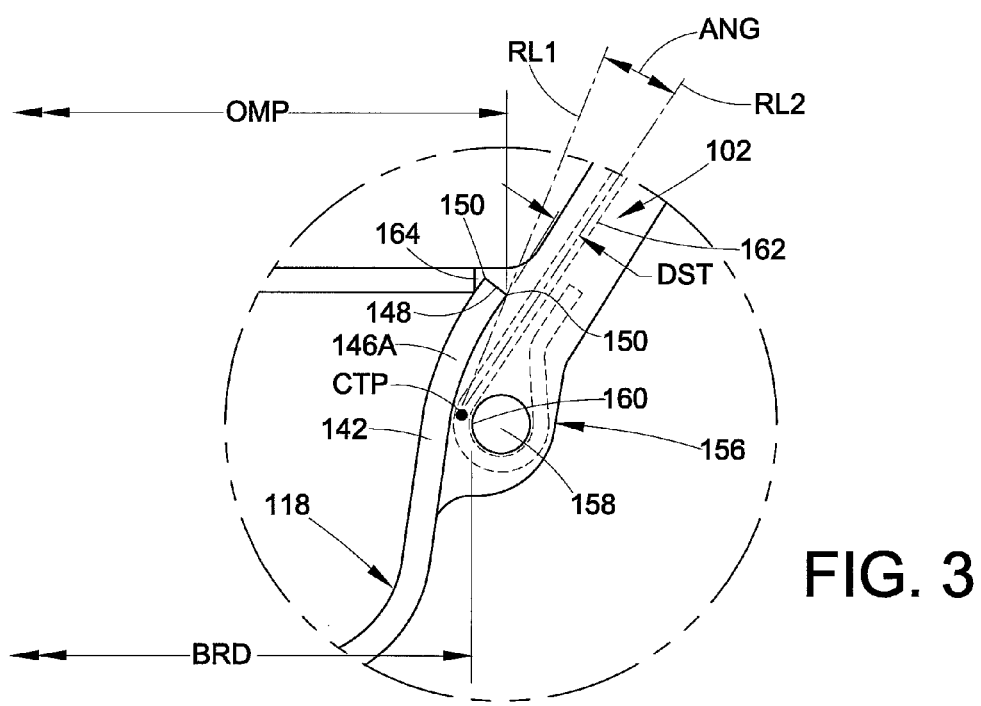
FIG. 3 is an alternate embodiment of the exemplary spring wall and end structure shown in FIG. 2.
Figure 4:
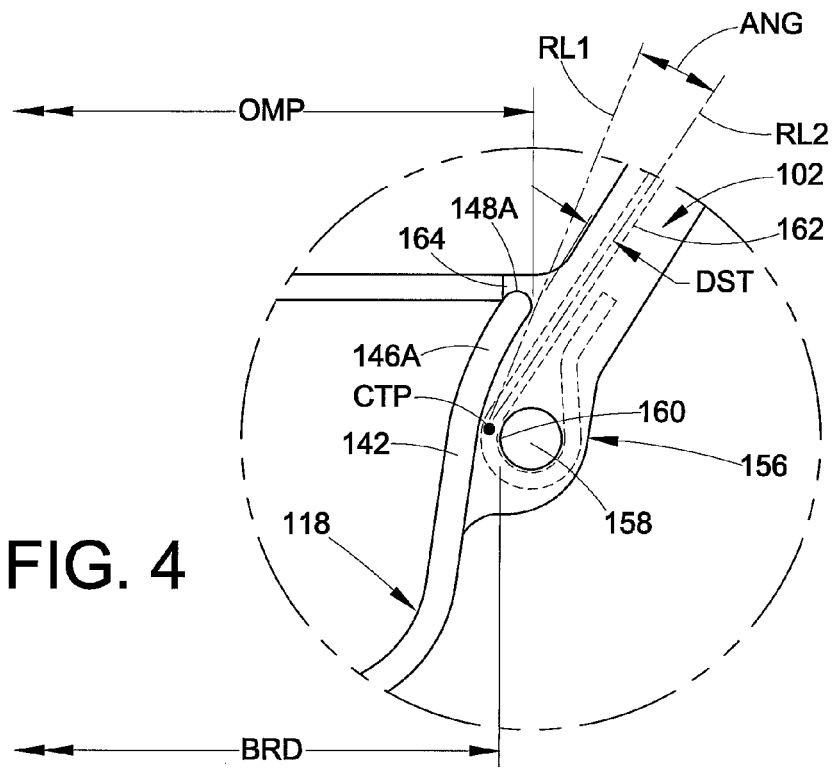
FIG. 4 is another alternate embodiment of the exemplary spring wall and end structure shown in FIG. 2.
Figure 5:
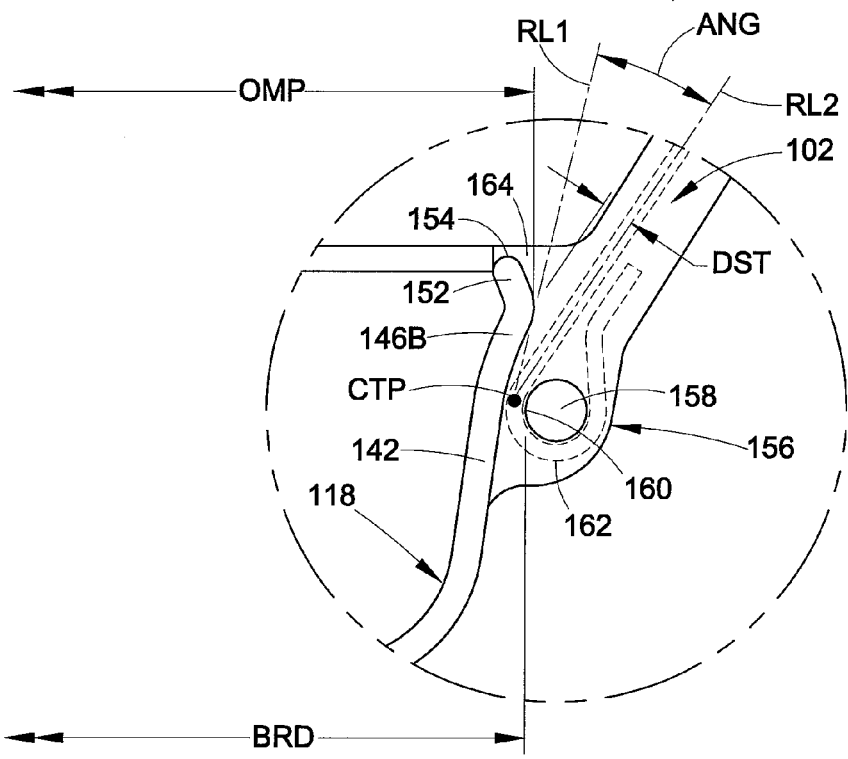
FIG. 5 is still another alternate embodiment of the exemplary spring wall and end structure shown in FIG. 2.

Additionally, in the embodiments in FIGS. 1-3, an edge 148 of radially-outwardly projecting lips 146 and 146A extends approximately transverse to the profile of the lips such that corners 150 (shown in FIG. 3 only) are formed along the side wall. As an alternate construction of the embodiment shown in FIG. 3, a rounded or fully-radiused edge 148A can be provided on or along the end of lip 146A of second or side wall 142, such as is shown in FIG. 4, for example. As shown in FIGS. 2-4, in some arrangements the outermost peripheral area or wall portion, which is represented by dimension OMP, includes a radially-outwardmost extent of the lip (e.g., lip 146 and 146A). It will be appreciated, however, that the outermost peripheral area or wall portion can alternately be provided along another portion, area or section of the second or side wall. For example, an alternative construction of the embodiment shown in FIG. 4 is shown in FIG. 5 that includes a first radially-outwardly projecting wall portion or lip 146B and a second wall portion or lip 152 that extends from the first wall portion or lip toward an edge 154, which is shown as having a radiused or fully-rounded shape, though it will be appreciated that any suitable shape or edge could alternately be used.

Turning now to flexible wall 102, second end 106 thereof is shown in the exemplary embodiments in FIGS. 1-5 as including a mounting section or mounting bead 156 that extends along the second end circumferentially about axis AX. Mounting bead 156 includes a bead wire 158 that similarly extends circumferentially about the axis. It will be appreciated that bead wires of a variety of shapes, sizes and constructions are well known and commonly used. In the exemplary embodiment shown, bead wire 158 is generally toroidal having a circular shape as well as a circular cross-section. Thus, bead wire 158 has at least a radially-inward surface area or surface portion 160 that at least partially defines an opening (not numbered) through the bead wire. Additionally, an inside dimension of the bead wire is at least partially established by the radially-inward surface area thereof. In the exemplary embodiment shown, the bead wire has an inside dimension, as represented by dimension BRD in FIG. 2, that is less than the outermost peripheral dimension OMP of the end structure.

As discussed above, a flexible wall in accordance with the present disclosure is formed from at least a filament structure and a quantity of elastomeric material. In the exemplary embodiment shown, flexible wall 102 includes a filament structure 162 that extends longitudinally along the flexible wall such that a first portion of the filament structure extends through the opening in the bead wire and is disposed along or otherwise adjacent radially-inward surface area 160. The filament structure is then turned-up around or about bead wire 158 and returns toward the main portion of the filament structure in a direction generally away from the bead wire. A similar arrangement can optionally be used at or along the first end of the flexible wall as well.

Regardless of the type or construction of the bead wire or the shape or profile of the side wall of the end structure, the end of the flexible wall (e.g., second end 106 of flexible wall 102) is positioned along the side wall of the end structure such that at least a first portion of the filament structure embedded within the flexible wall is compressively captured between the bead wire and the side wall of the end structure. In the exemplary embodiment shown, mounting bead 156 of second end 106 is positioned along second wall 142 such that the portion of filament structure 162 that is disposed along radially-inward surface area 160 of bead wire 158 is compressively captured between the bead wire and the second wall which thereby forms or at least approximates a line of contact (not shown) along the filament structure. A point along the line of contact is shown in FIGS. 2-5, as indicated by reference characters CTP.

The filament structure of a flexible wall in accordance with the present disclosure extends from contact point CTP in radially-outwardly spaced relation to the side wall of the end structure. As such, a quantity of elastomeric material is disposed or otherwise provided between the outermost peripheral area or wall portion of the end structure and the filament structure. This arrangement is expected to provide a substantially gas-impermeable barrier between the end structure and any pathways formed through the flexible wall by the filament structure. Thus, any separation of materials that might occur along the end structure, such as separation of an inner elastomeric wall portion 164, for example, will not provide access for pressurized gas from the spring chamber to reach the pathways of the filament structure.

The quantity of elastomeric material disposed between the filament structure and the outermost peripheral area or wall portion of the end structure can be measured or otherwise determined in any suitable manner. For example, a thickness of the elastomeric material or the distance between the filament structure and the outermost peripheral area or wall portion of the end structure can be used, such as is indicated by dimension DST in FIGS. 2-5, for example. It will be appreciated that any distance or thickness of material that is suitable for providing a substantially gas-impermeable barrier between the end structure and any pathways formed through the flexible wall by the filament structure can be used. As one example, a distance or thickness of at least approximately 0.005 inches can be used. As another example, a distance or thickness of greater than approximately 0.025 inches could be used. As still another example, a distance or thickness of greater than approximately 0.050 inches could be used. As a further example, a distance or thickness of greater than approximately 0.100 inches could be used.

As an alternative, an angular measurement or determination could be used to establish that the filament structure extends in radially-outwardly spaced relation to the outermost peripheral area or wall portion of the end structure. This alternative measurement or determination could also be used to ensure that a sufficient distance or spacing between the filament structure and the end structure exists to provide a substantially gas-impermeable barrier between the end structure and any pathways formed through the flexible wall by the filament structure.

Such an angular measurement or determination can be made in any suitable manner. For example, a reference line RL1 can be formed or otherwise established from contact point CTP through or along outermost peripheral area or extent OMP of side wall 142 of the end closure. A reference line RL2 can be formed or otherwise established that approximates the orientation or alignment of filament structure 162 and/or the direction in which the filament structure extends from contact point CTP. An included angle ANG between reference lines RL1 and RL2 can then be determined. It will be appreciated that included angle ANG can be of any value or amount that is suitable for providing sufficient elastomeric material between the filament structure and the side wall of the end structure, as discussed above. As one example, included angle ANG can be approximately 5 degrees or greater. As another example, included angle ANG could be approximately 10 degrees or greater. As still another example, included angle ANG could be approximately 20 degrees or greater.

Figure 6:
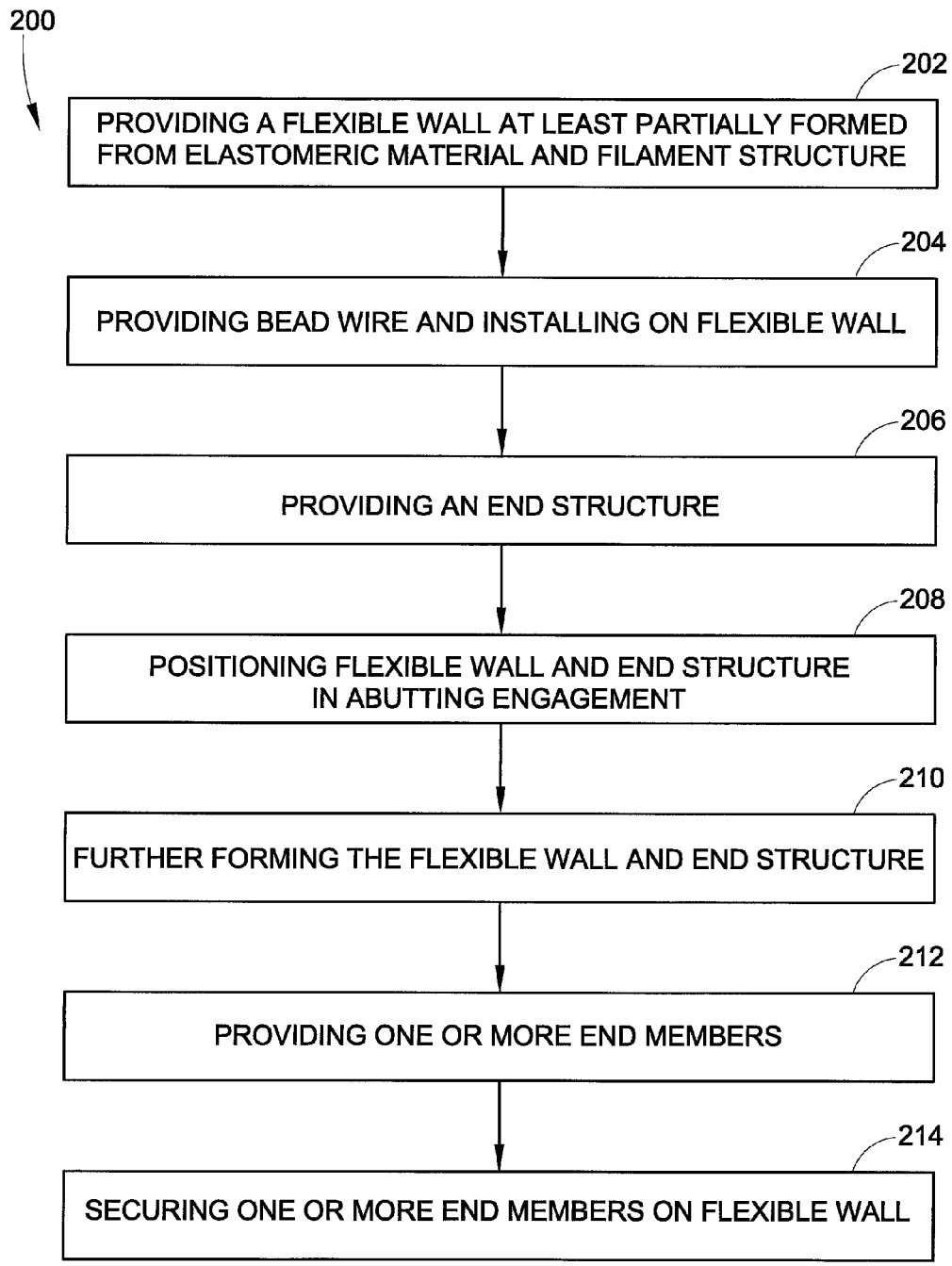
FIG. 6 is a flowchart representing one exemplary method of manufacturing a gas spring assembly in accordance with the present disclosure.

Turning now to FIG. 6, one exemplary method 200 of manufacturing a gas spring assembly in accordance with the present disclosure includes providing a flexible wall, such as flexible wall 102, for example, that is at least partially formed (e.g., assembled but in a green or otherwise uncured condition) and includes a filament structure and a quantity of elastomeric material, as indicated by reference number 202. Method 200 also includes providing a bead wire and installing the bead wire on or along a portion of the flexible wall, as indicated by reference number 204. Method 200 also includes providing an end structure, such as end closure 118, for example, as indicated by reference number 206.

Method 200 further includes positioning the flexible wall and the end structure in abutting engagement with one another, as indicated by reference number 208. In one exemplary operation, the flexible wall and end structure are positioned relative to one another such that a portion of the filament structure is compressively captured between the bead wire and the end structure. Method 200 also includes further processing at least the flexible wall to radially-outwardly space the filament structure from the end structure and to bond the elastomeric material to the end structure to form a substantially fluid-tight seal therewith, as indicated by reference number 210. Method 200 can optionally include providing one or more end members, as indicated by reference number 212, and securing the one or more end member on or along the flexible wall, as indicated by reference number 214.

It will be appreciated that any suitable flexible or elastomeric material can be used for forming flexible wall 102, such as natural rubber, synthetic rubber and/or one or more thermoplastic elastomers, for example. Additionally, it will be appreciated that any suitable processing methods and/or operations can be used to form the flexible or elastomeric material into flexible wall 102, such as molding and/or vulcanizing, for example. Furthermore, any suitable secondary forming or other processing operations can also optionally be used, such as compression molding or vulcanizing (e.g., bladder curing and steam curing), for example. Furthermore, it will be appreciated that any suitable material or combination of materials can be used to form the filament structure, such as nylon strands, cotton yarn and/or aramid fibers, for example.

As used herein with reference to certain elements, components and/or structures (e.g., "first end member" and "second end member"), numerical ordinals merely denote different singles of a plurality and do not imply any order or sequence unless specifically defined by the claim language. Additionally, the term "gas" is used herein to broadly refer to any gaseous or vaporous fluid. Most commonly, air is used as the working medium of suspension systems and the components thereof, such as those described herein. However, it will be understood that any suitable gaseous fluid could alternately be used.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. A gas spring assembly comprising:
a first end member adapted for securement along a first associated structural component;
a second end member adapted for securement along a second associated structural component and spaced from said first end member such that a long-extending axis is disposed therebetween;
a flexible wall extending circumferentially about said longitudinally-extending axis such that said flexible wall includes first and second ends, said first end of said flexible wall secured on said first end member such that a substantially fluid-tight seal is formed therebetween, said flexible wall formed from a filament structure and a quantity of elastomeric material, said filament structure extending longitudinally within said flexible wall between said first and second ends;
a bead wire including a radially-inward surface area, said bead wire extending circumferentially about said longitudinal axis and being formed into said flexible wall along said first end thereof such that a first portion of said filament structure extends through said bead wire along said radially-inward surface area; and,
an end closure including an end wall and a side wall that extends longitudinally from said end wall, said side wall including an outermost peripheral wall portion disposed generally opposite said end wall that extends radially outwardly beyond at least a portion of said bead wire;
said end closure being received within said second end of said flexible wall and bonded thereto such that a substantially fluid-tight seal is formed therebetween, said end closure being positioned along said flexible wall such that said first portion of said filament structure is compressively captured between said bead wire and said side wall of said end closure which thereby establishes a line of contact about said end closure, said filament structure extending from along said line of contact in radially-outwardly spaced relation to said outermost peripheral wall portion of said side wall such that an angle is formed between said filament structure and said end wall to form a gas impermeable barrier comprising a quantity of elastomeric material having a thickness of at least 0.005 inches disposed between said filament structure and said outermost peripheral wall portion.

2. A gas spring assembly according to claim 1, wherein said quantity of material disposed between said filament structure and said outermost peripheral wall portion has a thickness of at least 0.025 inches.

3. A gas spring assembly according to claim 1, wherein said quantity of material disposed between said filament structure and said outermost peripheral wall portion has a thickness of at least 0.050 inches.

4. A gas spring assembly according to claim 1, wherein said quantity of material disposed between said filament structure and said outermost peripheral wall portion has a thickness of at least 0.100 inches.

5. A gas spring assembly according to claim 1, wherein said side wall includes a radially-outwardly projecting lip disposed along said side wall generally opposite said end wall.

6. A gas spring assembly according to claim 5, wherein said outermost peripheral wall portion of said side wall includes an outermost peripheral extent of said radially-outwardly projecting lip.

7. A gas spring assembly according to claim 5, wherein said radially-outwardly projecting lip extends circumferentially about said end closure and has one of a frustoconical outer profile and a curvilinear outer profile.

8. A flexible wall and end structure assembly comprising:
a flexible wall extending circumferentially about a longitudinally-extending axis and thereby forming opposing first and second open ends, said flexible wall formed from a filament structure and a quantity of elastomeric material with said filament structure extending longitudinally within said flexible wall between said first and second ends;
a bead wire having a radially-inward surface area at least partially defining an inside dimension of said bead wire, said bead wire disposed circumferentially about said longitudinally-extending axis and embedded within said flexible wall along said first open end thereof such that a first portion of said filament structure extends through said bead wire along said radially-inward surface area; and,
an end structure including a first wall extending approximately transverse to said longitudinally-extending axis and a second wall extending in approximate alignment with along said longitudinally-extending axis, said second wall including an outermost peripheral wall area that at least partially defines an outside dimension of said end structure with said outside dimension being greater than said inside dimension of said bead wire;
said end structure being positioned along said flexible wall such that said second wall of said end structure is received within said first end of said flexible wall and said first portion of said filament structure is compressively captured between said radially-inward surface area of said bead wire and said second wall of said end structure to thereby form a line of contact along said filament structure, said end structure and said flexible wall being bonded together such that a substantially fluid-tight seal is formed therebetween; and,
said filament structure extending in radially-outwardly spaced relation to said second wall of said end structure such that a non-zero included angle is formed between a first cross-sectional reference line extending from a point along said line of contact along said filament structure to said outermost peripheral wall area of said second wall and a second cross-sectional reference line extending from said point along said line of contact to a radially-innermost point along said filament structure; and a gas-impermeable barrier formed by elastomeric material formed between said filament structure and said second wall of said end structure.

9. A flexible wall and end structure assembly according to claim 8, wherein said second wall includes a radially-outwardly projecting lip disposed generally opposite said first wall.

10. A flexible wall and end structure assembly according to claim 9, wherein said radially-outwardly projecting lip includes one of a frustoconical lip portion extending outwardly from along said second wall and a curvilinear lip portion flaring outwardly from along said second wall.

11. A flexible wall and end structure assembly according to claim 9, wherein said outermost peripheral wall area includes at least a portion of said radially-outwardly projecting lip.

12. A flexible wall and end structure assembly according to claim 8, wherein said non-zero included angle is greater than about 10 degrees.

13. A flexible wall and end structure assembly according to claim 8, wherein said non-zero included angle is greater than about 20 degrees.

14. A method of manufacturing a gas spring assembly, said method comprising:
   a) at least partially forming a flexible wall from at least a filament structure and a quantity of elastomeric material such that said flexible wall extends circumferentially about a longitudinally-extending axis and thereby defines opposing first and second open ends of said flexible wall;
   b) providing a bead wire that includes a radially-inward surface area and positioning said bead wire along said flexible wall adjacent said first open end such that a first portion of said filament structure is disposed along said radially-inward surface area of said bead wire;
   c) providing an end structure that includes an end wall and a side wall extending from said end wall, said side wall including an outermost peripheral wall portion disposed generally opposite said end wall;
   d) receiving said end structure within said first open end of said flexible wall such that said first portion of said filament structure and said radially-inward surface area of said bead wire are disposed along said side wall portion;
   e) compressively capturing said first portion of said filament structure between said radially-inward surface area of said bead wire and said side wall portion of said end structure such that a line of contact is formed therealong; and,
   f) further processing said flexible wall and said end structure and thereby:
      f1) bonding said elastomeric material of said flexible wall to said end structure to form a substantially fluid-tight seal therebetween; and,
      f2) displacing said filament structure relative to said side wall of said end structure such that said filament structure extends from along said line of contact in radially-outwardly spaced relation to said outermost peripheral wall portion of said side wall thereby forming an angle between said filament structure and said end structure and forming a gas impermeable barrier of elastomeric material disposed between said filament structure and said end structure.

15. A method according to claim 14, wherein at least partially forming said flexible wall from said quantity of elastomeric material in a) includes at least partially forming said flexible wall from a quantity of uncured rubber.

16. A method according to claim 15, wherein further processing said flexible wall and said end structure in f) includes vulcanizing said uncured rubber and thereby bonding said uncured rubber to said end structure in f1) and thereby displacing said filament structure in f2).

17. A method according to claim 14, wherein providing an end structure in c) includes providing a radially-outwardly projecting lip along said side wall with said lip including one of a frustoconical lip portion and a curvilinear lip portion.

18. A method according to claim 17, wherein compressively capturing said first portion of said filament structure in e) includes displacing said flexible wall and said end structure relative to one another such that said bead wire is moved along said side wall toward said radially-outwardly projecting lip.

19. A method according to claim 14 further comprising providing a first end member and securing said first end member along one of said end structure and said second open end of said flexible wall.

20. A method according to claim 19 further comprising providing second end member and securing said second end member along the other of said end structure and said second open end of said flexible wall.

* * * * *